United States Patent Office 3,414,532
Patented Dec. 3, 1968

3,414,532
STABILIZATION OF POLYPROPYLENE AGAINST DEGRADATIVE DETERIORATION ON LONG-TERM EXPOSURE TO ELEVATED TEMPERATURES ABOVE 525° F.
Arthur C. Hecker, Forest Hills, N.Y., and Aaron Rosenbaum, Millburn, and Norman L. Perry, Wayne, N.J., assignors to Argus Chemical Corporation, Brooklyn, N.Y., a corporation of New York
No Drawing. Continuation-in-part of application Ser. No. 104,514, Apr. 21, 1961. This application Apr. 19, 1965, Ser. No. 449,277
25 Claims. (Cl. 260—23)

ABSTRACT OF THE DISCLOSURE

Stabilizer combinations are provided, useful in the stabilization of polypropylene against degradative deterioration in physical properties as a result of long-term exposure to elevated temperatures. The stabilizer combinations contain an aminoacetic acid compound and another polypropylene stabilizer, such as a polynuclear phenol, an organic phosphite, a polyvalent metal salt of an organic acid, and/or a thiodipropionate. A mononuclear phenol also can be employed with these stabilizer combinations.

In addition, polypropylene compositions are provided which contain as a stabilizer the aminoacetic acid compound, alone, or with one or more of the above-mentioned stabilizers.

The aminoacetic acid compound has the formula:

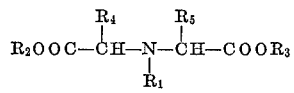

wherein $R_1$ is selected from the group consisting of $CHR_6CHR_7OH$,

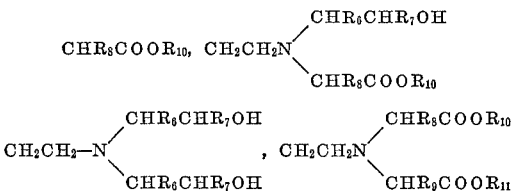

and a polymeric chain of $n$ units

where $n$ is an integer from 1 to 7, and a polymeric chain of $n$ units of

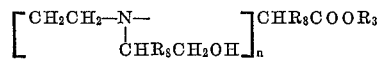

where $n$ is an integer from 1 to 7; and wherein $R_4$, $R_5$, $R_6$, $R_7$, $R_8$, and $R_9$ are selected from the group consisting of hydrogen, alkyl groups of from one to three carbon atoms and hydroxyalkyl groups containing from one to four carbon atoms; and $R_2$, $R_3$, $R_{10}$ and $R_{11}$ are selected from the group consisting of hydrogen, aliphatic, cycloaliphatic, aromatic and heterocyclic groups having from one to about eighteen carbon atoms.

---

This application is a continuation-in-part of U.S. application Ser. No. 104,514, filed Apr. 21, 1961, now abandoned.

This invention relates to stabilizer combinations comprising an aminoacetic acid compound useful in the stabilization of polypropylene against degradative deterioration in physical properties as a result of long-term exposure to elevated temperatures of at least 525° F., and to polypropylene compositions having increased stability against deterioration in physical properties over long periods of time due to the presence of such stabilizer or stabilizers, and to a process of stabilizing polypropylene, employing such stabilizer or stabilizers.

Polypropylene is a tough, high-melting polymeric material, but in several respects its stability leaves much to be desired. The polymer shows a tendency to decrease rapidly in melt viscosity and then to become brittle when kept at elevated temperatures for the time required in milling, calendering, extrusion, injection molding and fiber-forming equipment. This deterioration is particularly serious when the polymer is worked in the molten state in the presence of oxygen, e.g., air. Shaped polymers prepared in such equipment show a tendency to discolor, to become distorted, to crack, and to powder around the edges upon exposure to sunlight and during ageing, and especially when heated at moderately elevated temperatures as in an accelerated ageing process, and again, the problem is accentuated in the presence of oxygen.

One of the most serious stabilization problems is the poor resistance of the polymer to high temperatures, of the order of 400° F. to 525° F. and above. It is now possible using one or more stabilizers to obtain a reasonably good stability against deterioration under most processing conditions, except such high temperatures. Some stabilizers which are satisfactory in particular areas actually diminish high temperature stability, and some which alone increase high temperature resistance become ineffective in the presence of stabilizers added to correct other deteriorative tendencies.

To meet commercial requirements, it is, of course, quite important that the polymer retain its physical properties during all temperature conditions that may be encountered during processing and thereafter. However, the art has experienced great difficulty in achieving the necessary heat stabilization. The changes leading to heat deterioration in physical properties probably arise from chemical modification of the polymer, but the mechanism is not yet known. Lack of knowledge of the basis naturally has hindered the development of satisfactory heat stabilizers.

Polypropylenes tend to differ in their deteriorative tendencies according to the process by which they are prepared. Apparently, molecular weight and stereoregularity (tacticity) are factors. This complicates the development of a stabilizer which will make polypropylene sufficiently stable to be utilizable under high-temperature conditions. It would be an additional advantage if such a stabilizer could be incorporated either by the converter or by the manufacturer, without affecting or being itself affected disadvantageously by other stabilizer systems required to counteract other deteriorative effects.

In accordance with the instant invention, a heat stabilizer is provided, comprising an aminoacetic acid compound which, whether in combination with other polypropylene stabilizers or alone, improves the resistance of polypropylene to deterioration, as evidenced by change in melt index, at elevated temperatures of at least 525° F. and above, for long periods of time.

Purity of propylene polymers, extent of degradation, and resistance to embrittlement at elevated temperatures over long periods of time are characteristics capable of evaluation by observation of the change in the melt index of the particular polymer when subjected to specified temperatures for a specified time. There is a direct correlation between the rate of increase in melt index and the rate of deterioration in the above-mentioned physical qualities of the polymer. Aminoacetic acid compounds significantly reduced the rate of increase in melt index at elevated temperatures, and may also improve retention of other important physical properties of the polypropylene at elevated temperatures.

The aminoacetic acid compounds of the invention are defined by the following formula:

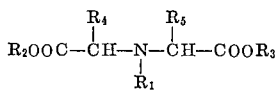

wherein $R_1$ is selected from the group consisting of $CHR_6CHR_7OH$,

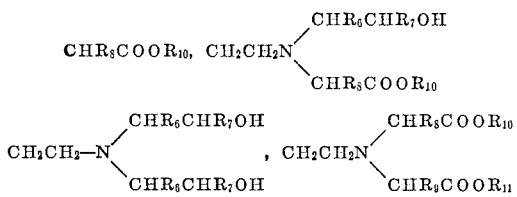

and a polymeric chain of $n$ units of

where $n$ is an integer from 1 to 7, and a polymeric chain of $n$ units of

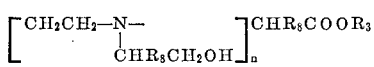

where $n$ is an integer from 1 to 7; and wherein $R_4$, $R_5$, $R_6$, $R_7$, $R_8$ and $R_9$ are selected from the group consisting of hydrogen, alkyl groups of from one to three carbon atoms; and hydroxyalkyl groups having from one to four carbon atoms; and $R_2$, $R_3$, $R_{10}$, and $R_{11}$ are selected from the group consisting of hydrogen, aliphatic, cycloaliphatic, aromatic and heterocyclic groups, having from one to about eighteen carbon atoms. $R_4$, $R_5$, $R_6$, $R_7$, $R_8$ and $R_9$ can, for example, be methyl, ethyl, propyl, isopropyl, $CH_2AH$, $CH_2CH_2OH$, $CH_2CH_2CH_2OH$ and

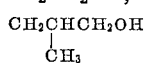

$R_2$, $R_3$, $R_{10}$ and $R_{11}$ can be, for example straight and branched chain alkyl groups such as methyl, ethyl, propyl, butyl, hexyl, lauryl, decyl, nonyl, octadecyl, isopropyl, isobutyl, tertiary butyl; cycloalkyl groups such as cyclopropyl, cyclohexyl, cyclopentyl and hexahydrotolyl; aryl groups such as phenyl and naphthyl; aralkyl and alkaryl groups such as tolyl, xylyl and benzyl. These may include inert substituents such as hydroxyl, amido, mercapto, thio and halogen groups, among others.

$R_4$ and $R_5$ may be taken together or with $R_1$ to form an N-heterocyclic ring, as with an alkylene group, for example, ethylene and propylene, or an arylene group, such as phenylene or

Exemplary of the aminoacetic acid compounds which can be used as polypropylene heat stabilizers in accordance with this invention are: ethylene diamine tetraacetic acid; the tetramethyl, tetraethyl, tetrapropyl, tetraisopropyl, tetrabutyl, tetrapentyl, tetrahexyl, tetrabenzyl, tetraamyl, tetraallyl, diethylene and diphenylene, esters of ethylene diamine tetraacetic acid; the symmetrical and asymmetrical configurations of the dimethyl, diethyl, dipropyl, diisopropyl, dibutyl, dipentyl, dibenzyl, diallyl, diamyl, monoethylene and monophenylene, esters of ethylene diamine tetraacetic acid; the trimethyl, triethyl, tripropyl, triisopropyl, tributyl, tripentyl, tribenzyl, triallyl and triamyl, esters of ethylene diamine tetraacetic acid mixed methyl ethyl esters, ethyl propyl esters, methyl ethyl propyl esters, methyl benzyl esters, and isopropyl hexyl amyl esters of ethylene diamine tetraacetic acid; as well as the methyl, ethyl, propyl, isopropyl, butyl, pentyl, hexyl, benzyl, amyl, and allyl esters of nitrilotriacetic (triglycollamic), hydroxyethylethylene-diaminetriacetic, hydroxyethyliminodiacetic, diethylene triamine pentaacetic, and tetraethylenepentamineheptaacetic acids.

Ethylene diamine tetraacetic acid is the most readily available and it is also quite effective in small amounts, and is therefore preferred. Its esters are very similar to the acid in properties, and are next preferred.

The aminoacetic acid compounds should have a low vapor pressure at polypropylene working temperatures, i.e., at approximately 350° F., so that they will not be lost from the mix during hot-working. Preferably, they should be substantially nonvolatile at this temperature. They should also be compatible with the resin at all temperatures to which the composition is to be subjected. The longer the R radical chains, and the more aliphatic in character, the better the compatibility with polypropylene. There is no upper limit on the number of carbon atoms, although usually the compound will not have more than about eighteen carbon atoms in any R group, and a total of not over about sixty carbon atoms in all.

The aminoacetic acid compounds can also be used in conjunction with other polypropylene stabilizers, without disadvantageous effect upon the stabilizing action of the other stabilizers. In such combinations, the aminoacetic acid compound increases resistance to deterioration at temperatures above 525° F., and the other stabilizers increase resistance to deterioration at temperatures below 525° F. In many cases, an enhanced activity is observed in such combinations. Such additional stabilizers include for instance phenols, organic phosphites, thiodipropionic acid esters, polyvalent metal salts of organic acids, organic mercaptans and organic polysulfides.

The phenol contains one or more phenolic hydroxyl groups, and may contain one or more phenolic nuclei. In addition, the phenolic nucleus may contain an oxy or thio ether group.

The alkyl-substituted phenols and polynuclear phenols because of their molecular weight have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in any alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one, or in the same or different rings, if there are more than one. In the case of bicyclic phenols, the rings can be linked by thio or oxyether groups, or by alkylene, alicyclene or arylene groups. Such phenols, which are preferred because of their superior stabilizing action, can be defined by the formula:

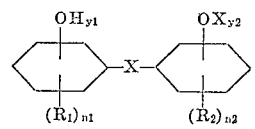

where X is an oxygen or sulfur atom, or an alkylene or alicyclene or arylene group or a mixed alkylene-alicyclene or alkylene-arylene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are

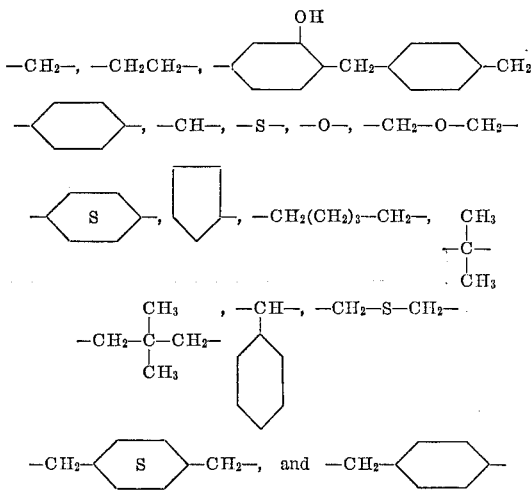

The various X and R groups are exemplified in the following compounds.

Exemplary of satisfactory monohydric phenols are 2,6 - di - tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol,
propyl gallate,
catechol,
resorcinol,
p-octyl resorcinol,
p-dodecyl resorcinol,
p-octadecyl catechol,
p-isooctyl-phloroglucinol,
pyrogallol,
hexahydroxy benzene,
p-isohexyl-catechol,
2,6-ditertiary butyl resorcinol,
2,6-diisopropyl phloroglucinol,
methylenebis-(2,6-ditertiary butyl-m-cresol),
methylenebis-(2,6-ditertiary butyl phenol),
2,2-bis(4-hydroxy phenyl)propane,
methylenebis-(p-cresol),
4,4'-thio-bisphenol,
4,4'-oxobis-(3-methyl-6-isopropyl phenol),
4,4'-thiobis(3-methyl-6-tertiary butyl phenol),
2,2'-oxobis-(4-dodecyl phenol),
2,2'-thiobis(4-methyl-6-tertiary butyl phenol),
2,6-diisooctyl resorcinol,
4,4'-n-butylidenebis-(2-tertiary-butyl-5-methyl-phenol),
4,4'-benzylidenebis(2-tertiary-butyl-5-methyl-phenol),
2,2'-methylenebis-(4-methyl-6-(1'-methylcyclohexyl)-phenol),
4,4'-cyclohexylidenebis-(2-tertiary-butylphenol),
2,6-bis(2'-hydroxy-3'-tertiary-butyl-5'-methylbenzyl)-4-methylphenol,
4-octyl pyrogallol, and
3,5-ditertiary butyl catechol.

The organic phosphite can be any organic phosphite having the formula $(RA)_3P$ in which A can be oxygen or sulfur or a mixture of the same, and R can be selected from the group consisting of aryl, alkyl, cycloalkyl, aralkyl and alkaryl groups, in any combinations. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, di-isooctyl mono-tolyl phosphite, tri-2-ethyl hexyl phosphite, phenyl dicyclohexyl phosphite, phenyldiethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2 - cyclohexylphenyl) phoshite, tri - α-naphthyl phosphite, tri(phenylphenyl) phosphite, tri(2-phenyl ethyl) phosphite, tridodecyl thiophosphite, tri-p-tert-butyl phenyl thiophosphite, dodecyl thiodiphenyl phosphite and tert-butyl phenyl thio-di-2-ethylhexyl phosphite.

The thiodipropionic acid ester has the following formula:

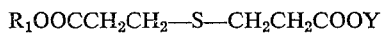

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyoxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

where Z is hydrogen, $R_2$ or M, $n$ is the number of thiodipropionic acid ester units in the chain, and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

According, the various thiodopropionic acid ester species coming within the above-designated categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX—O]_n$
   $OCCH_2CH_2SCH_2CH_2COOZ$
(d) $R_1OOCCH_2CH_2SCH_2CH_2COOM$

In the above formulae $R_1$ and $R_2$, M, X and Z are the same as before. In the polymer (c), as in the other forms of thiodipropionic acid esters, the total number of carbon atoms per sulfur atom is within the range from about ten to about sixty.

The R radical of these esters is improtant in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carboxylic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylpheny, naphthy, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalklene radicals such as those derived from diethlene glycol, triethylene glycol, polyoxypropylene glycol, polyoxyethylene glycol, and polyoxpropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

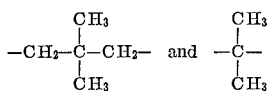

arylene radicals such as phenylene

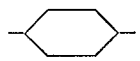

methylenephenylene

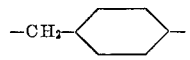

dimethylene phenylene,

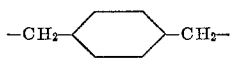

and alicyclylene such as cyclohexylene

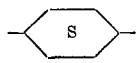

and cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

The polyvalent metal salt of an organic acid will have ordinarily from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonarmoatic and can include oxygen and cargon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexioc acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-napthalene acetic acid, orthobenzoyl benzoic acid, napthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating if necessary, until salt formation is complete.

The preferred stabilizer system of the invention comprises four stabilizers, the aminoacetic acid compound, an organic polyhydric phenol, an organic phosphite, and a thiodipropionic acid ester. An additional fifth ingredient which is included in the preferred systems of the invention, but which is not essential, is a polyvalent metal salt of an organic acid. These four and five stabilizers together give an enhanced stabilization which is not obtainable from any of them alone or in combinations of two or three. When taken alone, the components of this stabilizer system are capable only of inhibiting deterioration in one or two respects, and quite large amounts may be needed before any effect is noted. In such combinations, the aminoacetic acid compound imparts improved resistance to deterioration at temperature of 525° F. and above, and the other stabilizers impart resistance to deterioration at elevated temperatures up to 525° F. The components other than aminoacetic acid compound in pairs may display a lesser stabilizing effect than any one alone. For example, the phenol alone gives an improved resistance to embrittlement and reduction in melt viscosity at elevated temperatures, but little assistance as to maintenance of color. The phosphite alone is a rather poor stabilizer in preventing deterioration in the first two properties, but it does assist in resisting discoloration. The two together are worse than the phenol alone in every respect except color, which is intermediate.

The thiodipropionic acid ester by itself only improves resistance to embrittlement. The polyvalent salt of an organic acid by itself only prevents discoloration. In combinations with the phenol, the color is worse than with the salt alone, and in combinations with phosphite only discoloration is prevented.

In view of this, it is surprising that the aminoacetic acid compound, phenol, phosphite and thiodipropionic acid ester taken together in the same total amount not only prevent discoloration but also embrittlement and inhibit the increase in melt index at processing temperatures with accompanying degradation of physical properties, and furthermore greatly enhance the resistance to discoloration and embrittlement on ageing to far beyond that obtainable from the components individually. This enhanced stabilizing activity is obtained with any polypropylene, regardless of the process by which it is prepared.

A sufficient amount of the stabilizer, i.e., the aminoacetic acid compound, with or without additional stabilizers, is used to improve the stability against deterioration in physical properties, including, for example, reduction in melt viscosity and embrittlement, under the conditions to which the polypropylene wil be subjected. Very small amounts are usually adequate. Amounts within the range from about 0.005 to about 5% of aminoacetic acid compound by weight of the polypropylene impart satisfactory heat resistance. Preferably, from 0.1 to 2.5% is employed for optimum heat stabilization. If additional stabilizers are employed to obtain additional stabilization effects, the amount of total stabilizer is within the range from about 0.005 to about 5%, preferably from 0.1 to 2.5%.

Preferably, the stabilizer system comprises polypropylene, from about 0.001 to about 0.25% of the aminoacetic acid compound, from about 0.025% to about 0.5% of a phenol, from about 0.05 to about 1.25% of a phosphite, and from about 0.05 to about 1% of a thiodipropionic acid ester, with from about 0.025 to about 0.75% of a polyvalent metal salt, when present.

The stabilizer combination of the instant invention, taken alone, is composed of from about 0.01 to about 2.5 parts by weight of an aminoacetic acid compound, and from about 0.1 to about 35 parts by weight of at least one other polypropylene stabilizer.

Preferably, the stabilizer combination comprises from about 0.01 to about 2.5 parts by weight of aminoacetic acid compound, from about 0.1 to about 5 parts by weight of the phenol, from about 0.2 to about 12.5 parts by weight of the organic phosphite, and from about 0.2 to about 10 parts by weight of the thiodipropionate, with from about 0.1 to about 7.5 parts by weight of the polyvalent metal salt, when present.

If a combination of stabilizers is to be utilized, they may be formulated as a simple mixture for incorporation in the polymer by the polymer manufacturer or by the converter. An inert organic solvent can be used to facilitate handling, if the ingredients do not form a homogeneous mixture or solution.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

The stabilizer of the invention is applicable to polypropylenes prepared by any of the various procedures, for the molecular weight and tacticity are not factors affecting this stabilizer. Isotactic polypropylene, available commercially under the trade names Pro-Fax, Escon and Olefane and having a softening or hot-working temperature of about 350° F., is an example of a sterically regular polypropylene polymer.

Mixtures of polypropylene with other compatible polymers and copolymers of propylene with copolymerizable monomers not reactive with aminoacetic acid compounds also can be stabilized in accordance with this invention. For example, mixtures of polyethylene and polypropylene, and copolymers of propylene and ethylene which contain a sufficient amount of propylene to present the instability problem that is resolved by the stabilizer of the invention, may be stabilized by the addition of aminoacetic acid compounds, alone or in combination with other polypropylene stabilizers.

The stabilizers of the invention may also be used with polyolefins higher than polypropylene, such as polybutylene and polyisobutylene.

The stabilizer is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The heat stabilizing effect of the aminoacetic acid compounds of the invention was evaluated in the working examples which follow using a modified ASTM D1238–57T test procedure for determining melt index, using a 2160 g. weight load on the plastometer piston, comparing melt index of the polymer as obtained ($M_0$) with the melt index after molding three minutes at 375° F. ($M_I$) and with melt index after heating the polymer in a mold at 600° F. for 30 minutes ($M_{600°\,F.}$). The 600° F. temperature was selected in the region above 525° F. as an extreme, resistance to which for the test period ensured stability at 525° F. for a considerably extended period. The ratio of the change in melt index for this period $M_{600°\,F.}/M_{Initial}$ is a measure of the degree of heat stabilization imparted by the stabilizer added. The lower the ratio, the less the change, and the greater the stabilizing effect.

Example 1

Polypropylene stabilized with ethylene diamine tetraacetic acid was compared with unstabilized polypropylene. A total of 0.1% stabilizer was used. The ethylene diamine tetraacetic acid was weighed and dispersed by hand stirring in powdered previously unstabilized polypropylene (Polymer I). This polymer as supplied had a melt index of 0.3 ($M_0$), ASTM D1238–57T at 230° C. The mixture was placed on a 2-roll mill and fluxed for five minutes at 170±2° C. The melt index ($M_I$) of pieces cut from the milled sheet was obtained as well as $M_{600°\,F.}$, determined in the above-described manner. For comparison purposes a control was milled and fluxed in exactly the same manner. Due to the fluxing without a stabilizer, the initial melt index was lower than that of the starting polymer.

TABLE I

| Sample number | Parts A | Parts B |
|---|---|---|
| Polypropylene (Polymer I) | 100 | 100 |
| Ethylene diamine tetraacetic acid | | 0.1 |
| $M_0$ | 0.3 | 0.3 |
| $M_I$ | 15.8 | 15.2 |
| $M_{600°\,F.}$ | 52.8 | 29.6 |
| $M_{600°\,F.}/M_I$ | 3.3 | 1.9 |

NOTE.—$M_0$=Initial Melt Index; $M_I$=Melt Index after heating 3 min. at 375° F.; $M_{600°\,Fl}$=Melt Index after 30 min. at 600° F.; $M_{600°\,F.}/M_I$=Melt Index Ratio.

The data of Table I clearly indicate that the stabilizer of this invention has little effect at 375° F., but greatly improved the resistance of polypropylene to prolonged exposure at temperatures above 525° F., i.e., at 600° F. The added 0.1% of ethylene diamine tetraacetic acid by weight of polymer was sufficient to limit the increase in melt index due to degradative deterioration on long-term exposure to elevated temperatures to 1.9, as compared to 3.3 for an unstabilized polypropylene under the same conditions.

Example 2

Polypropylenes stabilized with ethylene diamine tetraacetic acid and nitrilotriacetic acid were evaluated against the unstabilized polymer. Equal proportions by weight of stabilizer were used in each case (see Table II). The stabilizers were weighed and dispersed by hand stirring in powdered previously unstabilized polypropylene (Polymer II). This polymer as supplied has a melt index of 2.5, ASTM D1238–57T at 230° C. The mixture was placed on a 2-roll mill and fluxed for five minutes at 170±2° C. Pieces cut from the milled sheet were used in the above described tests. The parts of stabilizer given are per 100 parts of polypropylene resin.

TABLE II

| Sample number | Parts | | |
|---|---|---|---|
| | C | D | E |
| Polypropylene (Polymer II) | 100 | 100 | 100 |
| Ethylene diamine tetraacetic acid | | 0.1 | |
| Nitrilotriacetic acid | | | 0.1 |
| $M_o$ | 2.5 | 2.5 | 2.5 |
| $M_I$ | 22.7 | 25.0 | 27.3 |
| $M_{600°\ F.}$ | 111.4 | 56.5 | 74.0 |
| $M_{600°\ F.}/M_I$ | 4.9 | 2.26 | 2.7 |

The data obtained from the tests show that both the ethylene diamine tetraacetic acid and nitrilotriacetic acid markedly increased the stability of the polymer at 600° F. when used singly. The improvement in the physical properties of the polymer was nearly identical for either stabilizer. By the addition of either of the stabilizers used in this example, the degradative deterioration due to prolonged exposure to 600° F. was reduced to less than half of that occurring in the unstabilized polymer.

Example 3

Polypropylene alone and previously stabilized by ditertiary butyl p-cresol was further improved by the addition of ethylene diamine tetraacetic acid and the tetrabutyl ester thereof. The stabilizers named in Table III were weighed and dispersed by hand stirring in 100 parts of powdered previously unstabilized polypropylene (Polymer III). This polymer as supplied had a melt index of 1.0, ASTM D1238–57T at 230° C. In some cases 0.25 part of ditertiary butyl p-cresol was used; an additional 0.1 part of ethylene diamine tetraacetic acid or its tetrabutyl ester was added in three cases as indicated in Table III. The mixture was in each case placed on a 2-roll mill and fluxed for five minutes at 170±2° C. Pieces cut from the milled sheet were used in the tests.

TABLE III

| Sample Number | Parts | | | | |
|---|---|---|---|---|---|
| | F | G | H | HA | HB |
| Polypropylene (Polymer III) | 100 | 100 | 100 | 100 | 100 |
| Ditertiary butyl p-cresol | | 0.25 | 0.25 | 0.25 | |
| Ethylene diamine tetraacetic acid | | | 0.1 | | 0.1 |
| Tetrabutyl ethylene diamine tetraacetic acid | | | | | 0.1 |
| $M_o$ | 1.0 | 1.0 | 1.0 | 1.0 | 1.0 |
| $M_I$ | 8.6 | 8.2 | 1.06 | 0.93 | 0.97 |
| $M_{600°\ F.}$ | 48.0 | 30.1 | 8.00 | 3.94 | 5.02 |
| $M_{600°\ F.}/M_I$ | 5.5 | 3.6 | 7.55 | 4.24 | 5.18 |

These data clearly indicate that both the ethylene diamine tetraacetic acid and its tetrabutyl ester increased the resistance of the polymer to degradative deterioration on prolonged exposure to elevated temperatures of the order of 525° F. and above. The phenol holds melt index at lower temperatures, as evidenced by the lower $M_I$, and the ethylene diamine tetraacetic acid and its tetrabutyl ester decrease the rate of deterioration at over 525° F., as evidenced by the melt index ratio.

Aminoacetic acid compounds are thus valuable in combination with some stabilizers which, although valuable in preserving some other physical property of a polymer, diminish its high temperature stability.

Example 4

A series of stabilized polypropylene compositions were prepared, using various quantities and combinations of stabilizers in accordance with the invention. A blend of phosphite and phenol was prepared before incorporation with metal salt, the thiodipropionic acid ester, and the resin, to prevent separation of the bisphenol. The concentrates of phenol and phosphite were blended with zinc 2-ethylhexoate and lauryl thiodipropionate. Equal portions of the above described stabilizing mixture were weighed and dispersed by hand stirring in powdered previously unstabilized polypropylene (Polymer II). The so stabilized polypropylene was compared with similarly stabilized polypropylene to which additional stabilizers were added. The additional stabilizers used in this test were ethylene diamine tetraacetic acid, the tetrabutyl and the tetraisooctyl ethylene diamine tetraacetic acid esters, in the proportions indicated in the table below.

TABLE IV

| Sample Number | Parts | | | |
|---|---|---|---|---|
| | I | J | K | L |
| Polypropylene (Polymer II) | 100 | 100 | 100 | 100 |
| Isooctyl diphenyl phosphite | 0.14 | 0.14 | 0.14 | 0.14 |
| Zinc 2-ethylhexoate | 0.06 | 0.06 | 0.06 | 0.06 |
| 4,4-thiobis(2-tert-butyl-5-methyl phenol) | 0.05 | 0.05 | 0.05 | 0.05 |
| Lauryl thiodipropionate | 0.25 | 0.25 | 0.25 | 0.25 |
| Ethylene diamine tetraacetic acid | | 0.05 | | |
| Tetrabutyl ethylene diamine tetraacetic acid | | | 0.10 | |
| Tetraisooctyl ethylene diamine tetraacetic acid | | | | 0.10 |
| $M_o$ | 2.5 | 2.5 | 2.5 | 2.5 |
| $M_I$ | 3.0 | 3.0 | 3.0 | 3.0 |
| $M_{600°\ F.}$ | 30.3 | 11.4 | 21.9 | 21.6 |
| $M_{600°\ F.}/M_I$ | 10.1 | 3.8 | 7.3 | 7.2 |

The results of these tests indicate, as above tabulated, that ethylene diamine tetraacetic acid and its esters each appreciably increased the thermal stability of the polypropylene at 600° F. beyond that achieved by the other known chemical stabilizers. Therefore, the stabilizing compositions of this invention may effectively be used to increase the resistance of prestabilized polypropylene to degradative deterioration on long term exposure to temperatures above 525° F. during hot working, calendering, molding, etc. The addition of ethylene diamine tetraacetic acid, for instance, increased the heat stability of the polymer by more than 60%.

Example 5

A polypropylene composition stabilized similarly to I and J of Example 4 was compared with one stabilized by such combination including a glycerine diester of ethylene dimaine tetraacetic acid. The stabilization data is tabulated as follows:

TABLE V

| Sample number | Parts | | |
|---|---|---|---|
| | M | N | O |
| Polypropylene (Polymer II) | 100 | 100 | 100 |
| Isooctyl diphenyl phosphite | 0.14 | 0.14 | 0.14 |
| Zinc 2-ethylhexoate | 0.06 | 0.06 | 0.06 |
| 4,4'-butylidene-bis (3-methyl-6-tert-butyl phenol) | 0.05 | 0.05 | 0.05 |
| Lauryl thiodipropionate | 0.25 | 0.25 | 0.25 |
| Ethylene diamine tetraacetic acid | | 0.05 | |
| Glycerine diester of ethylene diamine tetraacetic acid | | | 0.10 |
| $M_o$ | 2.5 | 2.5 | 2.5 |
| $M_I$ | 3.0 | 3.0 | 3.0 |
| $M_{600°\ F.}$ | 32.1 | 11.4 | 11.7 |
| $M_{600°\ F.}/M_I$ | 10.7 | 3.8 | 3.9 |

The very considerable improvement is resistance, over an extended period of time, to thermally induced degradative deterioration of the polymer at 600° F. achieved by the addition of ethylene diamine tetraacetic acid or its glycerine diester is evident from a comparison of the $M_{600°\,F.}/M_I$ ratios. In this instance the glycerine diester at $170\pm2°$ C. Pieces cut from the milled sheet were used to determine melt index after prolonged heating at $600°$ F.

TABLE VII

| Sample number | Parts | | | | |
|---|---|---|---|---|---|
| | R | S | T | U | V |
| Polypropylene (Polymer II) | 100 | 100 | 100 | 100 | 100 |
| Isooctyl diphenyl phosphite | 0.14 | 0.14 | 0.14 | 0.08 | 0.03 |
| Zinc 2-ethylhexoate | 0.06 | 0.06 | 0.06 | 0.04 | 0.01 |
| 4,4'-butylidene-bis(3-methyl-6-tert-butyl phenol) | 0.05 | 0.05 | 0.05 | 0.03 | 0.01 |
| Lauryl thiodipropionate | 0.25 | 0.25 | 0.20 | 0.08 | 0.42 |
| Ethylene diamine tetraacetic acid | | | 0.04 | 0.02 | 0.08 |
| $M_0$ | 2.5 | 2.5 | 2.5 | 2.5 | 2.5 |
| $M_I$ | 3.0 | 3.0 | 3.0 | 3.0 | 3.0 |
| $M_{600°\,F.}$ | 30.3 | 11.4 | 14.04 | 18.27 | 17.46 |
| $M_{600°\,F.}/M_I$ | 10.1 | 3.8 | 4.68 | 6.09 | 5.82 | of ethylene diamine tetraacetic acid increased the heat stability of the polypropylene by 63%, while the addition of ethylene diamine tetraacetic acid increased stability by 62%.

Example 6

Polypropylene stabilized with a combination of transesterified octyl diaphyl phosphite and 4,4'-thiobis (2-tert-butyl-5-methylphenol) with lauryl thiodipropionate was compared with a polymer so prestabilized containing ethylene diamine tetraacetic acid as an arritional stabilizer.

A blend of phosphite and phenol was prepared before incorporation with the polypropylene to prevent separation of the phenol, 4,4'-thiobis(2-tertiary-butyl-5-methylphenol) (100 g.), isooctyl diphenyl phosphite (150 g.), and calcium hydroxide (0.5 g.), were stirred and heated at 120 to 125° C. for three hours. At the end of this time, a clear brown solution had formed, and this solution remained homogeneous at room temperature. When the reaction mixture was heated at 125 to 135° C. under reduced pressure, phenol was distilled off, showing that transesterification had occurred.

The stabilizers were weighed and dispersed by hand stirring in powder polypropylene (Polymer II) in the proportions indicated in the following table. The resulting mixtures were each placed on a 2-roll mill and fluxed for five minutes at $170\pm2°$ C. Pieces cut from the milled sheet were tested as in the previous examples.

TABLE VI

| Sample number | Parts | |
|---|---|---|
| | P | Q |
| Polypropylene (Polymer II) | 100 | 100 |
| Transesterified mixture of isoocytl diphenyl phosphite and 4,4'-thiobis (2-tert-butyl-5-methylpenol) | 0.31 | 0.31 |
| Lauryl thiodipropionate | 0.25 | 0.25 |
| Ethylene diamine tetraacetic acid | | 0.10 |
| $M_0$ | 2.5 | 2.5 |
| $M_I$ | 3.0 | 3.0 |
| $M_{600°\,F.}$ | 36.57 | 24.03 |
| $M_{600°\,F.}/M_I$ | 12.19 | 8.01 |

The data tabulated above indicate that the addition of ethylene diamine tetraacetic acid to the prestabilized polymer reduced by 34% the degradative decomposition of the polypropylene due to prolonged exposure at 600° F.

Example 7

A series of polypropylene compositions was prepared, using various combinations of stabilizers in the proportions indicated in the table below in accordance with the method described in Example 4. Ethylene diamine tetraacetic acid, in varying proportions, was used as the additional stabilizer. The stabilizers were weighed and dispersed by hand stirring in previously unstabilized polypropylene (Polymer II). For each test the mixture was placed on a 2-roll mill and fluxed for five minutes at $170\pm2°$ C. Pieces cut from the milled sheet were used to determine melt index after prolonged heating at $600°$ F.

It is clear from the above data that the addition of ethylene diamine tetraacetic acid to a polypropylene stabilized with other chemical stabilizers markedly increases the resistance of the polymer to degradative deterioration on long term exposure temperatures above 525° F., using 600° F. as exemplary.

Example 8

A series of polypropylene stabilizing combinations was prepared in accordance with Example 4 using the proportions of Table VIII below. Ethylene diamine tetraacetic acid was used as the additional stabilizer. The portions of stabilizers were weighed and dispersed by hand stirring in powdered previously unstabilized polypropylene (Polymer IV). This polymer as supplied had a melt index of 2.8, ASTM D1238–57T at 230° C. The mixture was placed on a 2-roll mill and fluxed for five minutes at $170\pm2°$ C. Pieces cut from the milled sheet were used in the tests.

TABLE VIII

| Sample Number | Parts | | | |
|---|---|---|---|---|
| | W | X | Y | Z |
| Polypropylene (Polymer IV) | 100 | 100 | 100 | 100 |
| Isooctyl diphenyl phosphite | 0.14 | 0.14 | 0.14 | 0.14 |
| Zinc 2-ethylhexoate | 0.06 | 0.06 | 0.06 | 0.06 |
| 4,4'-thiobis (2-tert-butyl-5-methylphenol) | 0.05 | 0.5 | | |
| 4,4'-butylidene-bis(3-methyl-6-tert-butyl phenol) | | | 0.05 | 0.05 |
| Lauryl thiodipropionate | 0.25 | 0.21 | 0.25 | 0.21 |
| Ethylene diamine tetraacetic acid | | 0.04 | | 0.04 |
| $M_0$ | 2.8 | 2.8 | 2.8 | 2.8 |
| $M_I$ | 2.9 | 2.9 | 2.8 | 2.8 |
| $M_{600°\,F}$ | 77.2 | 32.2 | 60.5 | 10.1 |
| $M_{600°\,F.}/M_I$ | 26.6 | 11.1 | 21.6 | 3.7 |

The compositions without the ethylene diamine tetraacetic acid compound were of excellent stability at temperatures up to 375° F. as the $M_I$ values indicate, but poor at 600° F., typical of 525° F. and above. In the two instances where ethylene diamine tetraacetic acid was added as an additional stabilizer the resistance of the polymer to degradative deterioration at 600° F. was increased appreciably, in one case by more than 80%.

Example 9

A series of polypropylene stabilizing combinations was prepared in accordance with Example 4 using the proportions of Table IX, below. Ethylene diamine tetraacetic acid was used as the additional stabilizer. The portions of stabilizers were weighed and dispersed by hand stirring in powdered previously unstabilized polypropylene (Polymer II). The mixture was placed on a 2-roll mill and fluxed for five minutes at $170\pm2°$ C. Pieces cut from the milled sheet were used in the tests.

TABLE IX

| Sample Number | Parts | | | |
| --- | --- | --- | --- | --- |
| | XA | XB | XC | XD |
| Polypropylene (Polymer II) | 100 | 100 | 100 | 100 |
| Isooctyl diphenyl phosphite | 0.14 | 0.14 | 0.28 | 0.28 |
| Zinc 2-ethylhexoate | 0.06 | 0.06 | 0.12 | 0.12 |
| 4,4'-thiobis(2-tert-butyl-5-methyl phenol) | 0.05 | 0.05 | | |
| 4,4'-butylidene-bis(3-methyl-6-tert-butyl phenol) | | | 0.1 | 0.1 |
| Lauryl thiodipropionate | 0.25 | 0.25 | 0.5 | 0.42 |
| Ethylene diamine tetraacetic acid | | 0.05 | | 0.08 |
| $M_o$ | 2.5 | 2.5 | 2.5 | 2.5 |
| $M_I$ | 3.0 | 3.0 | 3.0 | 3.0 |
| $M_{600°\ F.}$ | 72.75 | 23.7 | 41.31 | 16.89 |
| $M_{600°\ F.}/M_I$ | 24.25 | 7.9 | 13.77 | 5.63 |

The above tabulated results supplement those of Example 8. The addition of ethylene diamine tetraacetic acid to a combination of other polypropylene stabilizers increased the resistance of the polymer to degradative deterioration due to prolonged exposure to elevated temperatures: e.g., 600° F., i.e., the ethylene diamine tetraacetic acid increased the thermal stability at 525° F. and above beyond that obtained with the other stabilizers.

Example 10

A series of stabilized polypropylene compositions were prepared, using various quantities and combinations of stabilizers in accordance with the invention. A blend of phosphite and phenol was prepared before incorporation with metal salt, the thiodipropionic acid ester, and the resin, to prevent separation of the phenol. The concentrates of phenol and phosphite were blended with zinc 2-ethylhexoate and lauryl thiodipropionate. Equal portions of the above described stabilizing mixture were weighed and dispersed by hand stirring in powdered previously unstabilized polypropylene (Polymer II). The so stabilized polypropylene was compared with similarly stabilized polypropylene to which varying amounts of aminoacetic acid stabilizer were added as an additional stabilizer in the proportions indicated in Table X below. The additional stabilizer used was nitrilotriacetic acid (triglycollamic acid).

TABLE X

| Sample Number | Parts | | | |
| --- | --- | --- | --- | --- |
| | XE | XF | XG | XH |
| Polypropylene (Polymer II) | 100 | 100 | 100 | 100 |
| Isooctyl diphenyl phosphite | 0.14 | 0.14 | 0.14 | 0.14 |
| Zinc 2-ethylhexoate | 0.06 | 0.06 | 0.06 | 0.06 |
| 4,4'-butylidene-bis(3-methyl-6-tert-butyl phenol) | 0.05 | 0.05 | 0.05 | 0.05 |
| Lauryl thiodipropionate | 0.25 | 0.25 | 0.25 | 0.25 |
| Nitrilotriacetic acid | | 0.025 | 0.05 | 0.10 |
| $M_o$ | 2.5 | 2.5 | 2.5 | 2.5 |
| $M_I$ | 3.6 | 4.0 | 3.3 | 3.2 |
| $M_{600°\ F.}$ | 29.2 | 14.4 | 11.9 | 11.4 |
| $M_{600°\ F.}/M_I$ | 8.1 | 3.6 | 3.6 | 3.5 |

A comparison of the melt index ratios, obtained in the above tests, indicates that the addition of nitrilotriacetic acid markedly improved the stability of a polypropylene composition to degradative deterioration due to prolonged exposure to elevated temperatures above 525° F., as exemplified by 600° F. The same order of improvement is obtained over the stated range of stabilizer concentration, 0.005 to 5%.

Example 11

A series of stabilized polypropylene compositions, using various quantities and combinations of stabilizers, in accordance with the invention and in the proportions indicated in the table below, were prepared in accordance with the method described in Example 4. The effect on the heat stabilization of the polymer by the addition of lauryl thiodipropionate and/or ethylene diamine tetraacetic acid was noted.

TABLE XI

| Sample Number | Parts | | | |
| --- | --- | --- | --- | --- |
| | XJ | XK | XL | XM |
| Polypropylene (Polymer II) | 100 | 100 | 100 | 100 |
| Isooctyl diphenyl phosphite | 0.14 | 0.14 | 0.14 | 0.14 |
| Zinc 2-ethylhexoate | 0.06 | 0.06 | 0.06 | 0.06 |
| 4,4'-butylidene-bis (3-methyl-6-tert-butyl phenol) | 0.05 | 0.05 | 0.05 | 0.05 |
| Lauryl thiodipropionate | | | 0.05 | 0.05 |
| Ethylene diamine tetraacetic acid | | 0.05 | | 0.05 |
| $M_o$ | 2.5 | 2.5 | 2.5 | 2.5 |
| $M_I$ | 3.0 | 3.1 | 3.1 | 3.1 |
| $M_{600°\ F.}$ | 15.80 | 12.15 | 45.7 | 13.7 |
| $M_{600°\ F.}/M_I$ | 5.28 | 4.05 | 15.2 | 4.43 |

In each of the above samples the greater heat stability at 600° F., as evidenced by the lowest melt index ratio, is achieved with ethylene diamine tetraacetic acid as a stabilizer. The data also indicates that an aminoacetic acid compound is effectively used to restore resistance to degradative deterioration where that resistance has been reduced by the addition of a compound such as a thiodipropionate, which preserves other physical properties of the polymer, but decreases its heat stability at 600° F.

Example 12

Commercially available prestabilized polypropylene, Profax 6511 and 6512, were compared with such polymers to which ethylene diamine tetraacetic acid had been added in accordance with this invention in the proportions indicated in the table below:

TABLE XII

| Sample Number | Parts | | | |
| --- | --- | --- | --- | --- |
| | XN | XO | XP | XQ |
| Commercial Prestabilized Polypropylene (Profax 6511) | 100 | 100 | | |
| Commercial Prestabilized Polypropylene (Profax 6512) | | | 100 | 100 |
| Ethylene diamine tetraacetic acid | | 0.1 | | 0.1 |
| $M_o$ | | | | |
| $M_I$ | 2.8 | 5.2 | 1.8 | 2.5 |
| $M_{600°\ F.}$ | 35.6 | 23.8 | 45.9 | 15.4 |
| $M_{600°\ F.}/M_I$ | 12.6 | 4.7 | 25.5 | 6.6 |

Although the polymers to which the ethylene diamine tetraacetic acid was added had a higher initial melt index $M_I$ (due to the degradation occurring during the preparation of test samples), the $M_{600°\ F.}$ and the final melt index ratio is appreciably lower for the samples to which the ethylene diamine tetraacetic acid was added as additional stabilizer, showing hte increase in heat stability at 600° F. due to the ethylene diamine tetraacetic acid.

Example 13

Polypropylene stabilized with hydroxyethyl ethylene diamine triacetic acid was compared with unstabilized polypropylene. A total of 0.2% stabilizer was used. The hydroxyethyl ethylene diamine triacetic acid was weighed and dispersed by hand stirring in powdered previously unstabilized polypropylene (Polymer I). This polymer as supplied had a melt index of 0.3, ASTM D1238–57T at 230° C. The mixture was placed on a 2-roll mill and fluxed for five minutes at 170±2° C. Pieces cut from the milled sheet were tested for heat stability in the above described manner.

TABLE XIII

| Sample number | Parts | |
| --- | --- | --- |
| | XR | XS |
| Polypropylene (Polymer I) | 100 | 100 |
| Hydroxyethyl ethylene diamine triacetic acid | | 0.2 |

The results of this test indicated that the resistance of the polypropylene to thermal degradation was appreciably improved by the addition of hydroxyethyl ethylene diamine triacetic acid as stabilizer.

Example 14

Polypropylene stabilized with hydroxyethyliminodiacetic acid was compared with unstabilized polypropylene. A total of 0.2% stabilizer was used. The hydroxyethyliminodiacetic acid was weighed and dispersed by hand stirring in powdered previously unstabilized polypropylene (Polymer I). This polymer as supplied had a melt index of 0.3, ASTM D1238-57T at 230° C. The mixture was placed on a 2-roll mill and fluxed for five minutes at 170±2° C. Pieces cut from the milled sheet were tested for heat stability in the above described manner.

TABLE XIV

| Sample Number | Parts | |
|---|---|---|
| | XT | XU |
| Polypropylene (Polymer I) | 100 | 100 |
| Hydroxyethyliminodiacetic acid | | 0.2 |

The data obtained indicate that hydroxyethyliminodiacetic acid appreciably reduced the extent of degradation of the polymer upon prolonged exposure to elevated temperatures, as compared to a sample of the same polymer which had not been stabilized by the addition of hydroxyethyliminodiacetic acid.

Example 15

Polypropylene stabilized with diethylene triamine pentaacetic acid was compared with unstabilized polypropylene. A total of 0.2% stabilizer was used. The diethylene triamine pentaacetic acid was weighed and dispersed by hand stirring in powdered previously unstabilized polypropylene (Polymer I). This polymer as supplied had a melt index of 0.3, ASTM D1238-57T at 230° C. The mixture was placed on a 2-roll mill and fluxed for five minutes at 170±2° C. Pieces cut from the milled sheet were tested for heat stability in the above described manner.

TABLE XV

| Sample Number | Parts | |
|---|---|---|
| | XV | XW |
| Polypropylene (Polymer I) | 100 | 100 |
| Diethylene triamine pentaacetic acid | | 0.2 |

As in the previous examples, the polymer sample to which an aminoacetic acid compound had been added, in this instance diethylene triamine pentaacetic acid, showed an appreciably lesser degree of degradation upon exposure to elevated temperature, than the unstabilized polypropylene.

Example 16

Polypropylene stabilized with tetraethylene pentamine heptaacetic acid was compared with unstabilized polypropylene. A total of 0.2% stabilizer was used. The tetraethylene pentamine heptaacetic acid was weighed and dispersed by hand stirring in powdered previously unstabilized polypropylene (Polymer I). This polymer as supplied had a melt index of 0.3, ASTM D1238-57T at 230° C. The mixture was placed on a 2-roll mill and fluxed for five minutes at 170±2° C. Pieces cut from the milled sheet were tested for heat stability in the above described manner.

TABLE XVI

| Sample Number | Parts | |
|---|---|---|
| | XX | XY |
| Polypropylene (Polymer I) | 100 | 100 |
| Tetraethylene pentamine heptaacetic acid | | 0.2 |

A comparison of the melt index ratios, obtained in the above test, indicated that the addition of tetraethylene pentamine heptaacetic acid improved the stability of the polymer to degradative deterioration due to prolonged exposure to elevated temperatures.

Having regard to the foregoing disclosure, the following is claimed as the inventive and patentable embodiments thereof:

1. A stabilizer combination for use in improving the resistance of polypropylene to deterioration in physical properties on exposure to temperatures as high as 525° F. and above, consisting essentially of an aminoacetic acid compound having the formula:

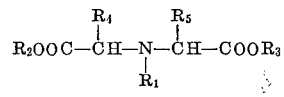

wherein $R_1$ is selected from the group consisting of $CHR_6CHR_7OH$,

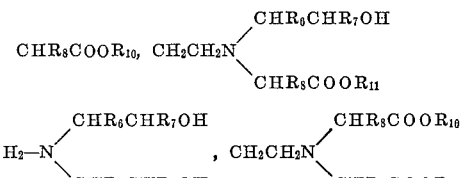

and a polymeric chain of n units of

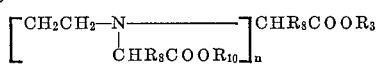

where n is an integer from 1 to 7, and a polymeric chain of n units of

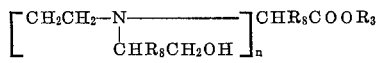

where n is an integer from 1 to 7; and wherein $R_4$, $R_5$, $R_6$, $R_7$, $R_8$ and $R_9$ are selected from the group consisting of hydrogen, alkyl groups of from one to three carbon atoms and hydroxyalkyl groups containing from one to four carbon atoms; and $R_2$, $R_3$, $R_{10}$ and $R_{11}$ are selected from the group consisting of hydrogen, aliphatic, cycloaliphatic, aromatic and heterocyclic groups having from one to about eighteen carbon atoms, in an amount of from about 0.01 to about 2.5 parts by weight of the combination; and at least one other polypropylene stabilizer in an amount of from about 0.1 to about 35 parts by weight of the combination, and selected from the group consisting of organic phosphites having the formula $(RA)_3P$ wherein A is selected from the group consisting of oxygen, sulphur and a mixture of oxygen and sulphur, and R is selected from the group consisting of aryl, alkyl, cycloalkyl, arylalkyl, and alkaryl groups; thiodipropionates; polyvalent metal salts of organic non-nitrogeneous monocarboxylic acids having from six to twenty-four carbon atoms; and polynuclear phenols, the stabilizers being compatible with polypropylene and having a low vapor pressure at polypropylene working temperatures.

2. A stabilizer combination in accordance with claim 1 in which the aminoacetic acid compound is ethylene diamine tetraacetic acid.

3. A stabilizer combination in accordance with claim 1 in which the aminoacetic acid compound is an ester of ethylene diamine tetraacetic acid.

4. A stabilizer combination in accordance with claim 1 in which the aminoacetic acid compound is tetrabutyl ethylene diamine tetraacetic acid.

5. A stabilizer combination in accordance with claim 1 in which the aminoacetic acid compound is tetraisooctyl ethylene diamine tetraacetic acid.

6. A stabilizer combination in accordance with claim 1 in which the aminoacetic acid compound is the glycerine diester of ethylene diamine tetraacetic acid.

7. A stabilizer combination in accordance with claim 1 including in addition, a mononuclear phenol.

8. A stabilizer combination in accordance with claim 1 consisting essentially of an aminoacetic acid compound and from about 0.1 to about 5 parts by weight of a bicyclic phenol.

9. A stabilizer combination in accordance with claim 1 consisting essentially of an aminoacetic acid compound and from about 0.2 to about 12.5 parts by weight of an organic phosphite.

10. A stabilizer combination in accordance with claim 1 consisting essentially of an aminoacetic acid compound and from about 0.1 to about 7.5 parts by weight of a polyvalent metal salt of an organic acid.

11. A stabilizer combination in accordance with claim 1 consisting essentially of an aminoacetic acid compound and from about 0.2 to about 10 parts by weight of a thiodipropionate.

12. A stabilizer combination in accordance with claim 1 consisting essentially of an aminoacetic acid compound and from about 0.1 to about 5 parts by weight of a phenol, from about 0.2 to about 12.5 parts by weight of an organic phosphite, and from about 0.2 to about 10 parts by weight of a thiodipropionate.

13. A stabilizer combination in accordance with claim 1 consisting essentially of an aminoacetic acid compound and from about 0.1 to about 5 parts by weight of a phenol, from about 0.2 to about 12.5 parts by weight of an organic phosphite, from about 0.2 to about 10 parts by weight of a thiodipropionate, and from about 0.1 to about 7.5 parts by weight of a polyvalent metal salt of an organic acid.

14. A polypropylene composition having improved resistance to deterioration upon exposure to temperatures as high as 525° F. and above, comprising polypropylene and a stabilizer combination in accordance with claim 1.

15. A polypropylene composition in accordance with claim 14 in which the polypropylene is a prestabilized polypropylene.

16. A polypropylene composition in accordance with claim 14 in which the polypropylene is an isotactic polypropylene.

17. A polypropylene composition in accordance with claim 14 having improved resistance to deterioration upon exposure to heat comprising polypropylene, from about 0.001 to about 0.25% of an aminoacetic acid compound, from about 0.025 to about 0.5% of a phenol, from about 0.05 to about 1.25% of an organic phosphite, and from about 0.05 to about 1% of a thiodipropionate.

18. A polypropylene composition in accordance with claim 17 comprising, in addition, from 0.025 to about 0.75% of a polyvalent metal salt of an organic acid.

19. A composition comprising a solid homopolymer of propylene; from 0.01% to 0.5% of N,N-bis(carboxymethyl) glycine and from 0.1% to 0.5% of dilauryl thiodipropionate.

20. A composition comprising a solid homopolymer of propylene, from 0.01 to 5% by weight each of a stabilizer combination comprising (a) a member selected from the group consisting of N-(2-hydroxyethyl)-ethylenediamine-N,N',N'-triacetic acid and ethylenediamine-N,N,N',N'-tetraacetic acid and (b) a phenol selected from the group consisting of 2,2'-thiobis(4-methyl-6-t-butylphenol) and 2,2'-methylenebis(4-methyl-6-t-butylphenol).

21. A composition comprising a solid homopolymer of propylene; from 0.01% to 0.5% of a compound of the formula:

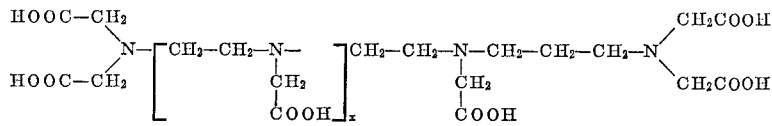

where $x$ is 0 to 1, and from 0.1% to 0.5% of dilauryl thiodipropionate.

22. A composition comprising a solid homopolymer of propylene, and from 0.01 to 5% by weight each of a stabilizer combination comprising (a) a member selected from the group consisting of N-(2-hydroxyethyl)-ethylenediamine-N,N',N'-triacetic acid and ethylenediamine-N,N,N',N'-tetraacetic acid and (b) 2,2'-thio-bis(4-methyl-6-t-butylphenol).

23. A composition comprising a solid homopolymer of propylene, and from 0.01 to 5% by weight each of a stabilizer combination comprising (a) a member selected from the group consisting of N-(2-hydroxyethyl)-ethylenediamine-N,N',N'-triacetic acid and ethylenediamine-N,N,N',N'-tetraacetic acid and (b) 4,4'-thio-bis(6-t-butyl-m-cresol).

24. A composition comprising a solid homopolymer of propylene, and from 0.01 to 5% by weight each of a stabilizer combination comprising (a) a member selected from the group consisting of N-(2-hydroxyethyl)-ethylenediamine - N,N',N'-triacetic acid and ethylenediamine-N,N,N',N'-tetraacetic acid and (b) 4,4'-butylidene-bis(6-t-butyl-m-cresol).

25. A composition comprising a solid homopolymer of propylene, and from 0.01 to 5% by weight each of a stabilizer combination comprising (a) a member selected from the group consisting of N-(2-hydroxyethyl)-ethylenediamine-N,N',N'-triacetic acid and ethylenediamine-N,N,N',N'-tetraacetic acid and (b) butylated hydroxyanisole.

References Cited
UNITED STATES PATENTS 3,068,197   12/1962   Rocklin _____ 260—45.85

DONALD E. CZAJA, *Primary Examiner.*

HOSEA E. TAYLOR, Jr., *Assistant Examiner.*

UNITED STATES PATENT OFFICE
CERTIFICATE OF CORRECTION

Patent No. 3,414,532                                                  December 3, 1968

Arthur C. Hecker et al.

It is certified that error appears in the above identified patent and that said Letters Patent are hereby corrected as shown below:

Column 3, line 37, "CH$_2$AH" should read -- CH$_2$OH --. Column 4, line 70, "a$_1$icyclene" should read -- alicyclene --. Column 5, lines 6 to 9, the right-hand formula should appear as shown below:

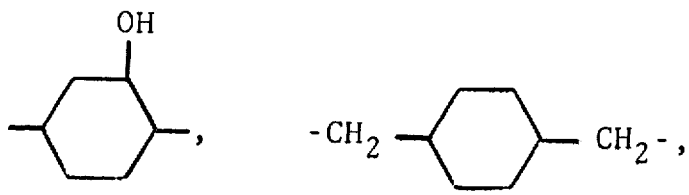

same column 5, lines 12 to 15,

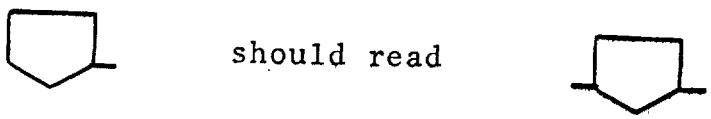

Column 6, line 62, "improtant" should read -- important --. Column 7, line 3, "ethylpheny" should read -- ethylphenyl --; same line 3, "naphthy" should read -- naphthyl --; line 6, "polyoxyalklene" should read -- polyoxyalkylene --; line 7, "diethlene" should read -- diethylene --. Column 8, line 18, "cargon" should read -- carbon --; line 25, "ethylhexioc" should read -- ethylhexoic --; line 32, "napthenic" should read -- naphthenic --. Column 9, line 17, "wil" should read -- will --. Column 12, line 73, "is" should read -- in --. Column 13, line 25, "diaphyl" should read -- diphenyl --; line 28, "arritional" should read -- additional --. Column 16, TABLE XII, third column, sub-heading thereof, "XQ" should read -- XO --; same column 16, line 49, "hte" should read -- the --. Column 18, lines 19 to 22, for that portion of the right-hand formula reading "CHR$_8$COOR$_{11}$" should read -- CHR$_9$COOR$_{11}$ --.

Signed and sealed this 24th day of March 1970.

(SEAL)
Attest:

EDWARD M. FLETCHER, JR.                                    WILLIAM E. SCHUYLER, JR.
Attesting Officer                                                Commissioner of Patents